US009001195B2

(12) United States Patent
Nakahata

(10) Patent No.: US 9,001,195 B2
(45) Date of Patent: *Apr. 7, 2015

(54) IMAGE DISPLAY DEVICE, IMAGE DISPLAY VIEWING SYSTEM AND IMAGE DISPLAY METHOD

(75) Inventor: Yuji Nakahata, Kanagawa (JP)

(73) Assignee: Sony Corporation (JP)

(*) Notice: Subject to any disclaimer, the term of this patent is extended or adjusted under 35 U.S.C. 154(b) by 296 days.

This patent is subject to a terminal disclaimer.

(21) Appl. No.: 12/807,856

(22) Filed: Sep. 15, 2010

(65) Prior Publication Data

US 2011/0074938 A1 Mar. 31, 2011

(30) Foreign Application Priority Data

Sep. 30, 2009 (JP) .............................. P2009-225965

(51) Int. Cl.
H04N 13/04 (2006.01)
(52) U.S. Cl.
CPC ................................ H04N 13/0438 (2013.01)
(58) Field of Classification Search
None
See application file for complete search history.

(56) References Cited

U.S. PATENT DOCUMENTS

| 4,562,463 | A | 12/1985 | Lipton | |
|---|---|---|---|---|
| 6,456,432 | B1* | 9/2002 | Lazzaro et al. | 359/464 |
| 6,975,345 | B1* | 12/2005 | Lipton et al. | 348/57 |
| 8,106,941 | B2* | 1/2012 | Lee et al. | 348/51 |
| 2007/0035495 | A1* | 2/2007 | Chang | 345/87 |
| 2007/0165305 | A1* | 7/2007 | Mehrle | 359/464 |
| 2008/0043203 | A1* | 2/2008 | Jacobs et al. | 352/63 |
| 2008/0055402 | A1* | 3/2008 | DeCusatis et al. | 348/53 |
| 2008/0055546 | A1* | 3/2008 | DeCusatis et al. | 353/7 |
| 2008/0204546 | A1* | 8/2008 | Dawe et al. | 348/51 |
| 2009/0040402 | A1 | 2/2009 | Tomita et al. | |
| 2009/0153653 | A1* | 6/2009 | Lee et al. | 348/59 |
| 2009/0153743 | A1 | 6/2009 | Arashima | |
| 2009/0167846 | A1* | 7/2009 | Niioka et al. | 348/54 |
| 2009/0184890 | A1* | 7/2009 | Cowan et al. | 345/32 |

FOREIGN PATENT DOCUMENTS

| JP | 09-138384 A | 5/1997 |
|---|---|---|
| JP | 2000-036969 A | 2/2000 |
| JP | 2003-045343 A | 2/2003 |
| JP | 2003259395 A | 9/2003 |

(Continued)

OTHER PUBLICATIONS

Office Action from Japanese Application No. 2009-225965, dated Mar. 19, 2013.
Office Action from China Application No. 201010297528.1, dated Jul. 15, 2013.
Partial European Search Report from EP Application No. 10178376, dated Sep. 23, 2013.

(Continued)

Primary Examiner — Jay Patel
Assistant Examiner — Reza Aghevli
(74) Attorney, Agent, or Firm — Lerner, David, Littenberg, Krumholz & Mentlik, LLP

(57) ABSTRACT

An image display device of present invention includes a signal control portion that receives input of an image signal, and outputs a signal that causes an image for a right eye and an image for a left eye to be displayed alternately, a display panel to which the signal converted by the signal control portion is input, and which alternately displays the image for the right eye and the image for the left eye, and a polarity reversing portion that performs polarity reversal of a drive voltage of the display panel due to the signal, at least every time both the image for the right eye and the image for the left eye are displayed.

8 Claims, 11 Drawing Sheets

(56) References Cited

FOREIGN PATENT DOCUMENTS

| | | |
|---|---|---|
| JP | 2008306335 A | 12/2008 |
| JP | 2009-025436 A | 2/2009 |

OTHER PUBLICATIONS

European Search Report from EP Application No. 10178376, dated Feb. 14, 2014.

* cited by examiner

FIG.10

|  | 0 | 32 | 64 | 96 | 128 | 160 | 192 | 224 | 255 |
|---|---|---|---|---|---|---|---|---|---|
| 0 |  | 0 | 0 | 0 | 0 | 0 | 0 | 0 | 255 |
| 32 | 0 | 32 | 13 | 5 | 0 | 0 | 0 | 0 | 0 |
| 64 | 137 | 99 | 64 | 28 | 16 | 10 | 5 | 0 | 0 |
| 96 | 173 | 158 | 126 | 96 | 71 | 44 | 25 | 14 | 5 |
| 128 | 197 | 198 | 179 | 155 | 128 | 103 | 79 | 51 | 23 |
| 160 | 214 | 219 | 209 | 195 | 180 | 160 | 138 | 113 | 85 |
| 192 | 227 | 236 | 230 | 221 | 214 | 204 | 192 | 176 | 157 |
| 224 | 239 | 249 | 247 | 245 | 241 | 237 | 230 | 224 | 217 |
| 255 | 250 | 255 | 255 | 255 | 255 | 255 | 255 | 255 | 255 |
|  | 255 | 255 |  |  |  |  |  |  |  |

START LEVEL (columns); DESTINATION LEVEL (rows)

EXAMPLE OF LUT (1)

FIG.11

| DESTINATION LEVEL | START LEVEL | | | | | | | | |
|---|---|---|---|---|---|---|---|---|---|
| | 0 | 32 | 64 | 96 | 128 | 160 | 192 | 224 | 255 |
| 0 | 0 | 0 | 0 | 0 | 0 | 0 | 0 | 0 | 0 |
| 32 | 0 | 58 | 14 | 7 | 2 | 0 | 0 | 0 | 0 |
| 64 | 119 | 97 | 66 | 31 | 20 | 14 | 10 | 6 | 1 |
| 96 | 168 | 151 | 122 | 95 | 76 | 57 | 38 | 24 | 16 |
| 128 | 193 | 192 | 173 | 150 | 128 | 110 | 92 | 75 | 58 |
| 160 | 210 | 214 | 204 | 190 | 175 | 158 | 145 | 128 | 114 |
| 192 | 224 | 231 | 224 | 217 | 209 | 201 | 190 | 183 | 175 |
| 224 | 237 | 247 | 245 | 242 | 238 | 234 | 230 | 222 | 221 |
| 255 | 248 | 255 | 255 | 255 | 255 | 255 | 255 | 255 | 255 |
| | 255 | | | | | | | | |

EXAMPLE OF LUT (2)

IMAGE DISPLAY DEVICE, IMAGE DISPLAY VIEWING SYSTEM AND IMAGE DISPLAY METHOD

CROSS-REFERENCE TO RELATED APPLICATION

The present application claims priority from Japanese Patent Application No. JP 2009-225965 filed in the Japanese Patent Office on Sep. 30, 2009, the entire content of which is incorporated herein by reference.

BACKGROUND OF THE INVENTION

1. Field of the Invention

The present invention relates to an image display device, an image display viewing system and an image display method.

2. Description of the Related Art

A method is known in which an image for a left eye and an image for a right eye having parallax therebetween are alternately supplied to a display at a predetermined interval, and the images are viewed using glasses with liquid crystal shutters that are driven in synchronization with the predetermined interval. The method is described in, for example, Japanese Patent Application Publication No. JP-A-9-138384, Japanese Patent Application Publication No. JP-A-2000-36969 and Japanese Patent Application Publication No. JP-A-2003-45343.

SUMMARY OF THE INVENTION

A liquid crystal display that displays normal two-dimensional images performs polarity reversal for each frame in order to prevent burn-in caused by biased polarity. However, with a liquid crystal display that displays stereoscopic images, if it reverses polarity for each frame when it alternately displays left and right images, an image for a left eye and an image for a right eye may constantly have the same polarity in some cases. Particularly, in a case where parallax between the image for the left eye and the image for the right eye is large, if attention is focused on a certain pixel, the luminance of one of the image for the left eye and the image for the right eye is high, and the luminance of the other image is low. As a result, a high luminance image and a low luminance image are alternately displayed.

Therefore, during a display period, constantly, a high luminance image and a low luminance image are alternately displayed for each frame. Consequently, a burn-in phenomenon occurs on a display panel.

Further, in a case where not only burn-in but also a difference in luminance is occurring due to polarity, the difference in luminance due to the polarity (which is time-averaged and may not be visually recognized during two-dimensional image display) is visually recognized because images with the same polarity alone are seen through the shutter glasses.

In light of the foregoing, it is desirable to provide a novel and improved image display device, image display viewing system and image display method that are capable of reliably suppressing problems caused by a bias in the polarity of liquid crystal when three-dimensional images are displayed.

According to an embodiment of the present invention, there is provided an image display device including a signal control portion that receives input of an image signal, and outputs a signal that causes an image for a right eye and an image for a left eye to be displayed alternately, a display panel to which the signal converted by the signal control portion is input, and which alternately displays the image for the right eye and the image for the left eye, and a polarity reversing portion that performs polarity reversal of a drive voltage of the display panel due to the signal, at least every time both the image for the right eye and the image for the left eye are displayed.

In this configuration, the signal control portion outputs a signal that causes the image for the right eye and the image for the left eye to be displayed consecutively at least twice.

In this configuration, the image display device further includes an insertion portion that inserts one of a gray image and a black image to some of the images for the right eye and the images for the left eye.

In this configuration, the image display device further includes an overdrive processing portion that performs overdrive processing on the signal, the overdrive processing portion performs the overdrive processing using a different parameter depending on whether the polarity reversal is performed.

According to another embodiment of the present invention, there is provided an image display viewing system including an image display device and stereoscopic image viewing glasses. The image display device includes a signal control portion that receives input of an image signal, and outputs a signal that causes an image for a right eye and an image for a left eye to be displayed alternately, a display panel to which the signal converted by the signal control portion is input, and which alternately displays the image for the right eye and the image for the left eye, a polarity reversing portion that performs polarity reversal of a drive voltage of the display panel due to the signal, at least every time both the image for the right eye and the image for the left eye are displayed, and a shutter control portion that performs control such that a timing signal is generated for stereoscopic image viewing glasses provided with a right eye shutter and a left eye shutter, the timing signal indicating an open period of the right eye shutter and the left eye shutter. The stereoscopic image viewing glasses have the right eye shutter and the left eye shutter, and alternately open the right eye shutter and the left eye shutter based on the timing signal.

According to another embodiment of the present invention, there is provided an image display method, including the steps of receiving input of an image signal, and outputting a signal that causes an image for a right eye and an image for a left eye to be displayed alternately, inputting the converted signal, and alternately displaying the image for the right eye and the image for the left eye, and performing polarity reversal of a drive voltage of a display panel due to the signal, at least every time both the image for the right eye and the image for the left eye are displayed.

According to the embodiments of the present invention described above, it is possible to reliably suppress problems caused by a bias in the polarity of liquid crystal when three-dimensional images are displayed.

BRIEF DESCRIPTION OF THE DRAWINGS

FIG. 10 is a schematic diagram showing a lookup table LUT1 that is used for writing immediately after performing the polarity reversal; and FIG. 11 is a schematic diagram showing a lookup table LUT2 that is used when the polarity reversal is not performed.

DETAILED DESCRIPTION OF THE EMBODIMENT(S)

Figure 1:
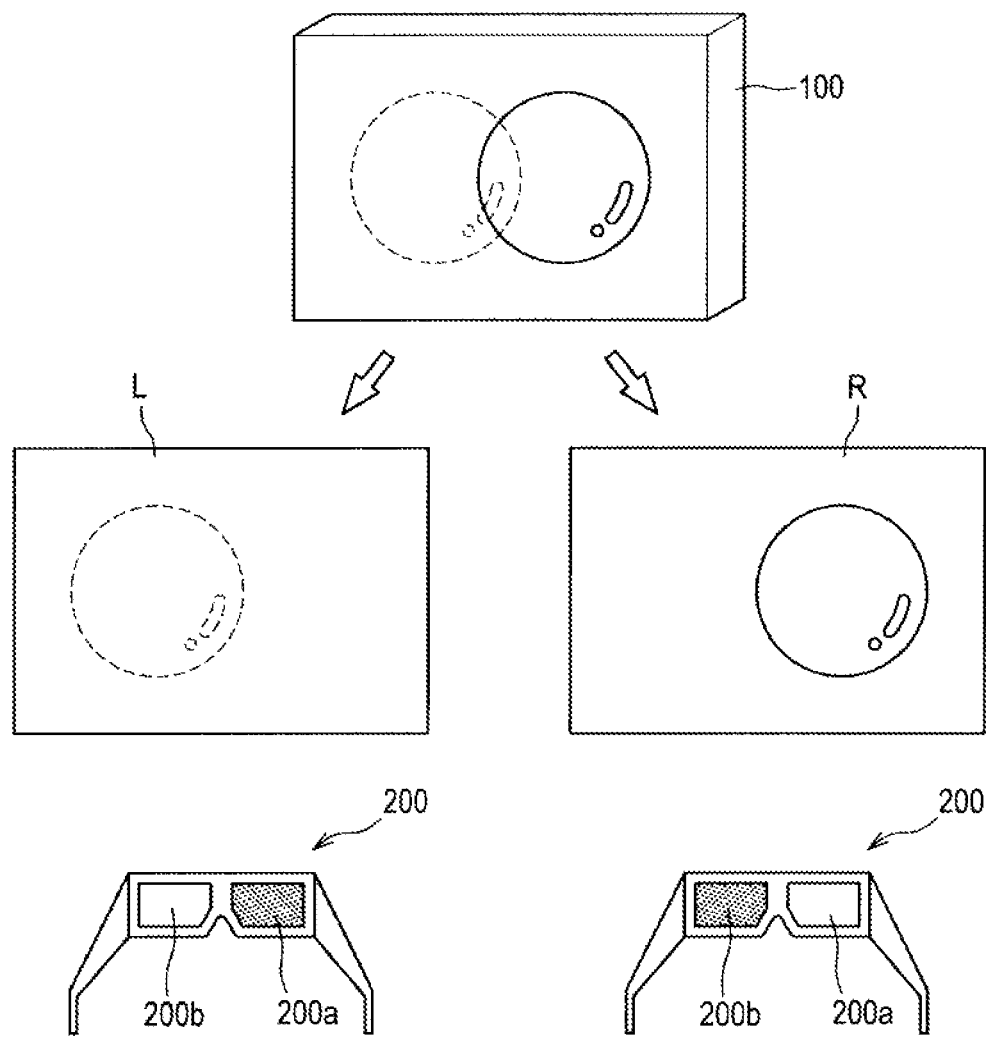
FIG. 1 is a schematic diagram showing a configuration of a stereoscopic image display viewing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that a description will be made in the following order.
1. First embodiment
(1) System configuration example
(2) Configuration example of image display device
(3) Example of "write twice" according to present embodiment
(4) Timing of polarity reversal of voltage applied to liquid crystal
2. Second embodiment
(1) Example of drive voltage in case of "write once" operation
3. Third embodiment
(1) Example of drive voltage in case of gray insertion
4. Fourth embodiment
(1) Overdrive parameter 1. First Embodiment
(1) System Configuration Example FIG. 1 is a schematic diagram showing a configuration of a stereoscopic image display viewing system according to an embodiment of the present invention. As shown in FIG. 1, the stereoscopic image display viewing system according to the present embodiment includes an image display device 100 that is formed by a liquid crystal display (LCD), and displayed image viewing glasses 200.

The image display device 100 is a stereoscopic image display device of a time-division type, for example, and alternately displays an image for a left eye and an image for a right eye on a full screen at very short intervals. Further, the image display device 100 provides images separately to the left eye and to the right eye, in synchronization with the display intervals of the image for the left eye and the image for the right eye. The image display device 100 alternately displays an image R for the right eye and an image L for the left eye for each field, for example. The displayed image viewing glasses 200 include a pair of liquid crystal shutters 200a and 200b at sections corresponding to lenses. The liquid crystal shutters 200a and 200b alternately perform an opening and closing operation in synchronization with image switching that is performed for each field of the image display device 100. More specifically, in a field in which the image R for the right eye is displayed on the image display device 100, the liquid crystal shutter 200b for the left eye is closed, and the liquid crystal shutter 200a for the right eye is open. On the other hand, in a field in which the image L for the left eye is displayed, a reverse operation to that described above is performed. In this manner, the image display device 100 alternately displays the image L for the left eye and the image R for the right eye on the full screen at very short intervals. At the same time, the image display device 100 provides the images separately to the left eye and to the right eye in synchronization with the display intervals of the image L for the left eye and the image R for the right eye.

Figure 2:
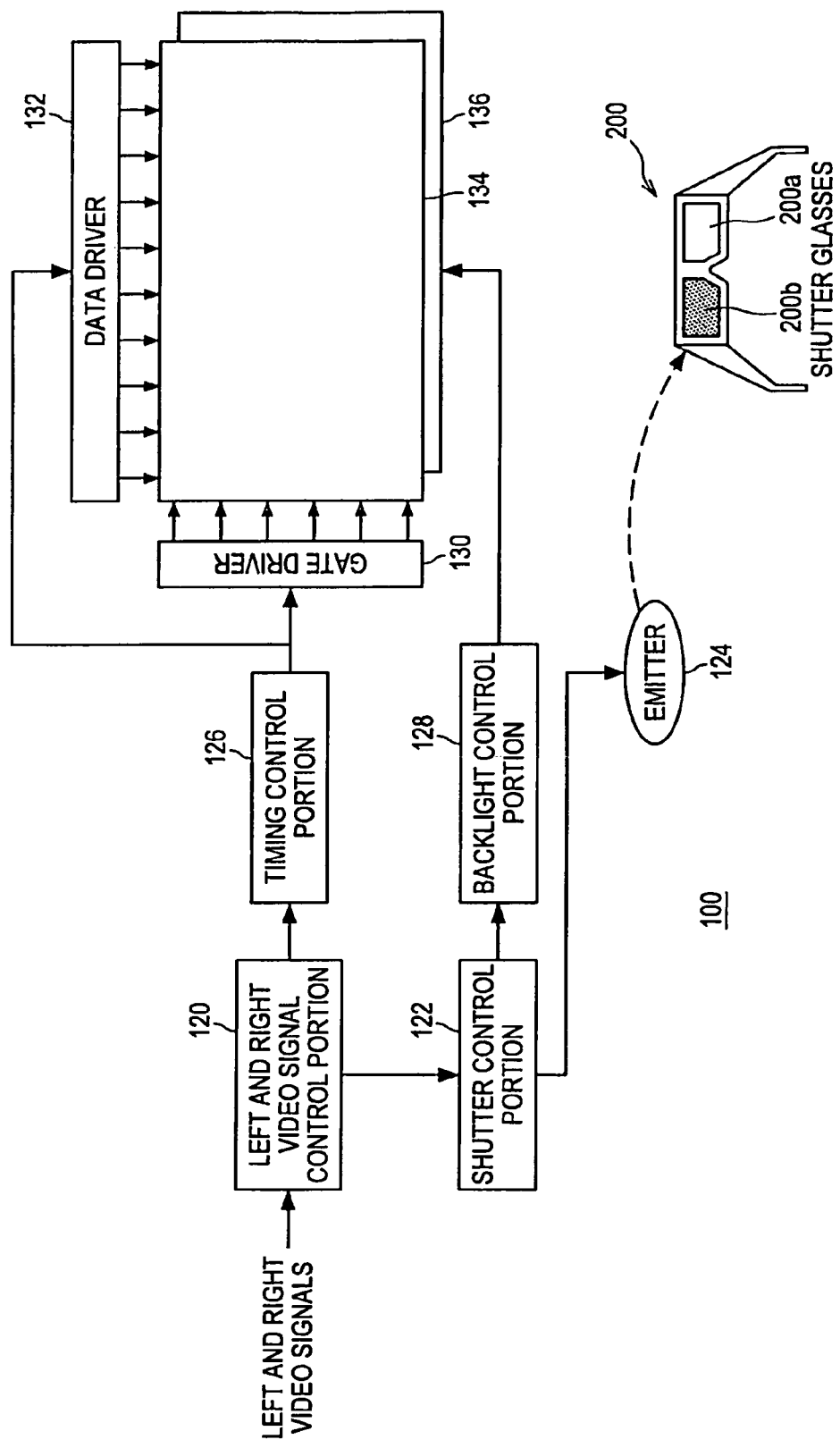
FIG. 2 is a block diagram showing a configuration of an image display device.

With the above-described operations, only the image R for the right eye is incident to the right eye of a user who looks at the image display device 100 wearing the displayed image viewing glasses 200, and only the image L for the left eye is incident to the left eye of the user. As a result, inside the eyes of the viewer (user), the images for the right eye and the left eye are synthesized, and the image displayed on the image display device 100 is perceived stereoscopically. Further, the image display device 100 can also display normal two dimensional images. In this case, switching between the image R for the right eye and the image L for the left eye is not performed.
(2) Configuration Example of Image Display Device Next, a configuration of the image display device 100 will be described. FIG. 2 is a block diagram showing the configuration of the image display device 100. As shown in FIG. 2, the image display device 100 is provided with a left and right video signal control portion 120, a shutter control portion 122, an emitter 124, a timing control portion 126, a backlight control portion 128, a gate driver 130, a data driver 132 and a liquid crystal display panel 134. A backlight (a surface light source) 136 is arranged on a rear side of the liquid crystal display panel 134.

The liquid crystal display panel 134 includes a liquid crystal layer, transparent electrodes that face each other with the liquid crystal layer interposed therebetween, a color filter and the like.

Left and right video signals to display the image R for the right eye and the image L for the left eye are input to the left and right video signal control portion 120. The left and right video signal control portion 120 alternately outputs a right eye video signal and a left eye video signal in order to alternately display the image R for the right eye and the image L for the left eye on the liquid crystal display panel 134. Further, based on the input right eye video signal and left eye video signal, the left and right video signal control portion 120 performs conversion on each of the right eye video signal and the left eye video signal such that same two signals are continued, in order to perform a "write twice" operation that will be described later. Further, the left and right video signal control portion 120 also functions as an insertion portion that inserts a gray image or a black image to each of the right eye video signal and the left eye video signal.

The right eye video signal and the left eye video signal that are converted by the left and right video signal control portion 120 are input to the timing control portion 126. The timing control portion 126 converts the input right eye video signal and left eye video signal to signals to be input to the liquid crystal display panel 134, and generates pulse signals to be used for operations of the gate driver 130 and the data driver 132. The timing control portion 126 performs processing to reverse polarity of a voltage applied to liquid crystal after writing the left and right images, which will be described later. Further, the timing control portion 126 also performs overdrive processing. Therefore, the timing control portion 126 functions as a polarity reversing portion and an overdrive processing portion. Note that an image processing method according to the present embodiment is achieved by processing that is sequentially performed by the left and right video signal control portion 120, the timing control portion 126 and the liquid crystal display panel 134.

The signals converted by the timing control portion 126 are input to the gate driver 130 and the data driver 132, respectively. The gate driver 130 and the data driver 132 receive the pulse signals generated by the timing control portion 126, and cause each pixel of the liquid crystal display panel 134 to emit light based on the input pulse signals. As a result, images are displayed on the liquid display panel 134.

Further, the left and right video signal control portion 120 transmits a timing signal to the shutter control portion 122. The timing signal indicates a switching timing between the right eye video signals and the left eye video signals that are converted such that two of them are continuous. Based on the timing signal transmitted from the left and right video signal control portion 120, the shutter control portion 122 transmits to the emitter 124 a driving signal that causes the emitter 124 to emit light. The emitter 124 transmits, to the displayed image viewing glasses 200, an optical signal that indicates a switching timing between the right eye video signals and the left eye video signals.

Although details are omitted, the displayed image viewing glasses 200 are provided with a sensor that receives the optical signal. When the sensor of the displayed image viewing glasses 200 receives the optical signal, the displayed image viewing glasses 200 alternately perform the opening and closing operation of the liquid crystal shutter 200a and the opening and closing operation of the liquid crystal shutter 200b, in synchronization with the switching timing between the right eye video signals and the left eye video signals of the image display device 100.

Further, the shutter control portion 122 transmits the timing signal indicating switching timing between the left and right images to the backlight control portion 128. The backlight control portion 128 outputs a control signal to cause the backlight 136 to emit light, based on the input timing signal. The backlight 136 emits light based on the control signal input from the backlight control portion 128.

(3) Example of "Write Twice" According to Present Embodiment

In order to eliminate the occurrence of crosstalk due to an insufficient response speed of liquid crystal, luminance insufficiency and the like, the present embodiment adopts a technique that increases a driving frequency of a liquid crystal panel, and causes the liquid crystal display panel 134 to display (write) one frame of the left and right images twice.

Figure 3:
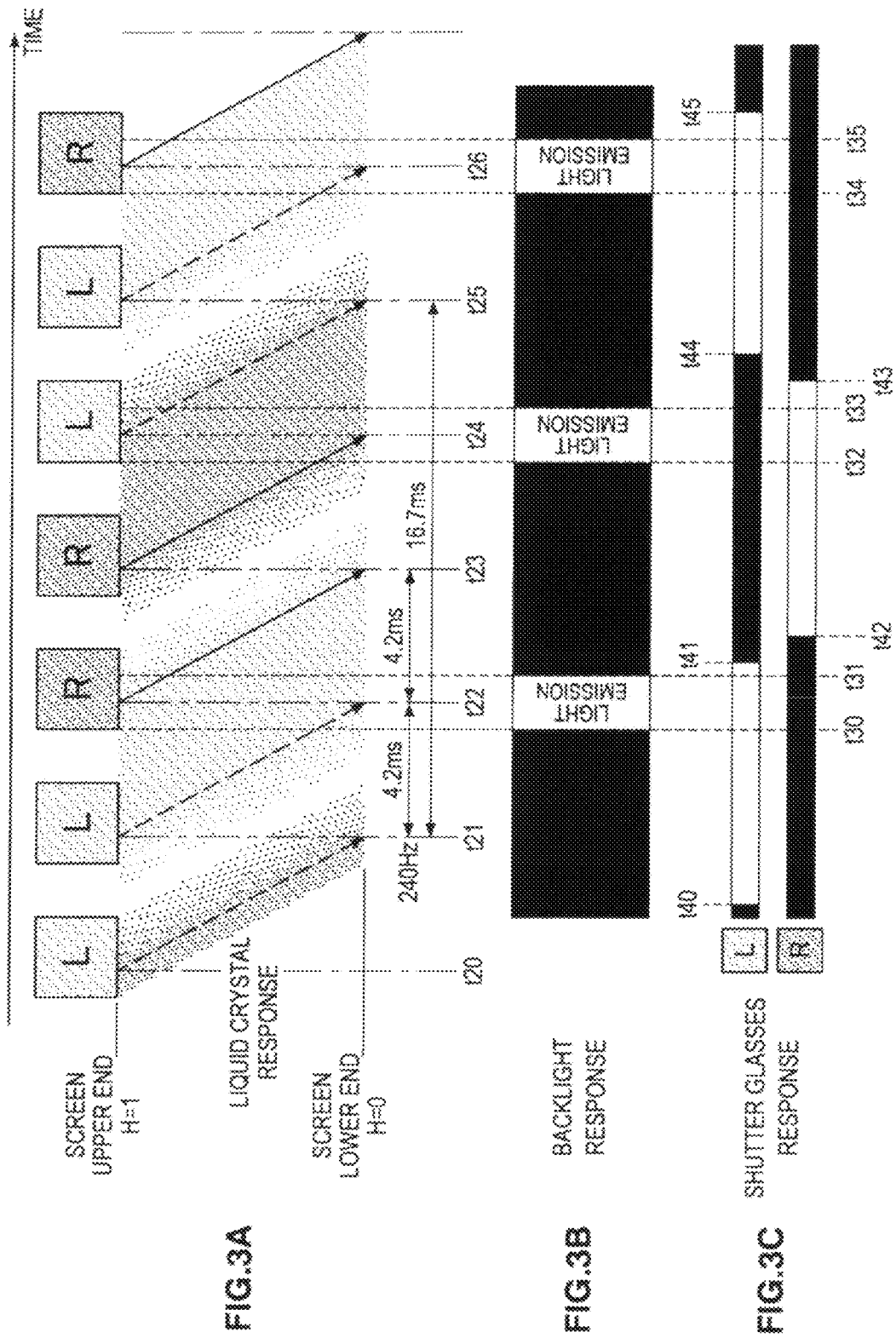
FIGS. 3A-3C are timing charts showing a principle of "write twice" according to the present embodiment, and opening and closing timings of liquid crystal shutters.

FIG. 3 is a timing chart showing a principle of "write twice" according to the present embodiment, and opening and closing timings of the liquid crystal shutters 200a and 200b. FIG. 3 shows a case in which the image R for the right eye and the image L for the left eye are each displayed at a driving frequency of 240 Hz. In FIG. 3, a time period during which the image R for the right eye or the image L for the left eye is displayed by one write operation is 1/240 Hz=4.2 ms.

FIG. 3A shows a manner in which luminance varies with time, at each position in the vertical direction from a lower end (H=0) of the screen to an upper end (H=1) of the screen of the liquid crystal display panel 134. FIG. 3B shows a manner in which the backlight 136 of the liquid crystal display panel 134 emits light. FIG. 3C shows the opening and closing timings of the liquid crystal shutters 200a and 200b. As shown in FIG. 3B and FIG. 3C, in the present embodiment, the backlight 136 emits light in synchronization with the opening and closing of the liquid crystal shutters 200a and 200b.

As shown in FIG. 3, at the upper end (H=1) of the screen, the image L for the left eye is written during a time period of 4.2 ms from a time t20 to a time t21. Following this, the image L for the left eye is written again during a time period of 4.2 ms from the time t21 to a time t22. Here, the image L for the left eye that is written from the time t20 to the time t21 and the image L for the left eye that is written from the time t21 to the time t22 are basically the same images. However, they may be different from each other due to an adjustment such as the overdrive processing. In addition, a predetermined blank period may be provided between the image L for the left eye that is written for the first time and the image L for the left eye that is written for the second time.

After writing the image L for the left eye twice, the image R for the right eye is written. Also regarding the image R for the right eye, at the upper end (H=1) of the screen, the image R for the right eye is written during a time period of 4.2 ms from the time t22 to a time t23. Following this, the image R for the right eye is written again during a time period of 4.2 ms from the time t23 to a time t24. The image R for the right eye that is written from the time t22 to the time t23 and the image R for the right eye that is written from the time t23 to the time t24 are basically the same images. However, they may be different from each other due to an adjustment such as the overdrive processing. In addition, a predetermined blank period may be provided between the image R for the right eye that is written for the first time and the image R for the right eye that is written for the second time, or between the image L for the left eye and the image R for the right eye.

Generally, a liquid crystal display device has a relatively low response time. Therefore, if writing time is short, each pixel does not reach a desired luminance. For that reason, if the driving frequency is increased and the image R for the right eye and the image L for the left eye are alternately written, the time for one write operation becomes shorter than 4.2 ms, and the desired luminance is reached only after a first write operation. As a result, there is no timing at which the luminance of both the upper end and the lower end of the screen has reached the desired luminance.

In the present embodiment, each of the image R for the right eye and the image L for the left eye is written twice consecutively. Therefore, the desired luminance can be maintained at the time of a second write operation. Thus, the desired luminance can be reached at both the upper end and the lower end of the screen.

At the time t22 shown in FIG. 3A, the luminance of the image L for the left eye has reached a desired level in all regions from an upper edge of the screen to a lower edge of the screen. Therefore, it is possible to reliably suppress the occurrence of crosstalk by visually recognizing the image L for the left eye during a predetermined time period (for example, 2.1 ms) centered on the time t22.

In a similar manner to the above, also regarding the image R for the right eye, at the time t24 shown in FIG. 3A, the luminance of the image R for the right eye has reached a desired level in all regions from the upper edge of the screen to the lower edge of the screen. Therefore, it is possible to reliably suppress the occurrence of crosstalk by visually recognizing the image R for the right eye during a predetermined time period (for example, 2.1 ms) centered on the time t24.

Note that crosstalk and luminance have a trade-off relationship. Therefore, depending on which one is given priority, the light emission time of the backlight 136 can be set as appropriate.

Note that when the "write twice" operation as in the present embodiment is not performed, if the image R for the right eye and the image L for the left eye are alternately displayed with a low frequency at which liquid crystal can respond, flicker (flickering in the screen) occurs. The flicker occurs when the driving frequency at which one frame of the image R for the right eye or the image L for the left eye is displayed is set to be equal to or less than 60 Hz, for example. In the present embodiment, the driving frequency of the liquid crystal is set to 240 Hz, for example. Therefore, it is possible to reliably suppress the occurrence of flicker.

(4) Timing of Polarity Reversal of Voltage Applied to Liquid Crystal

With a normal liquid crystal display, polarity reversal is performed for each frame in order to prevent burn-in caused by a bias in the polarity. However, when the left and right images are alternately displayed as in the present embodiment, if the polarity reversal is performed for each frame, the image for the left eye and the image for the right eye may constantly have the same polarity in some cases. Particularly, when parallax between the image for the left eye and the image for the right eye is large, if attention is focused on a certain pixel, the luminance of one of the images is high, and the luminance of the other image is low. As a result, a high luminance image and a low luminance image are alternately displayed. In this case, particularly when stereoscopic still images are displayed, constantly, a high luminance image and a low luminance image are alternately displayed. Therefore, burn-in occurs if the polarity reversal is performed for each frame. When moving images are displayed, video varies in time series within a flat surface of the display panel. Further, the parallax between the left and right images also varies in accordance with changes of an apparent depth position of the video. Therefore, an influence is small compared to still images. However, a problem similar to that of the still images occurs in moving images as their movement becomes slower.

Further, in a case where not only burn-in but also a difference in luminance is occurring due to polarity, the difference in luminance due to the polarity (which is time-averaged and may not be visually recognized during 2D display) is visually recognized because images with the same polarity alone are seen through the shutter glasses.

Figure 4:
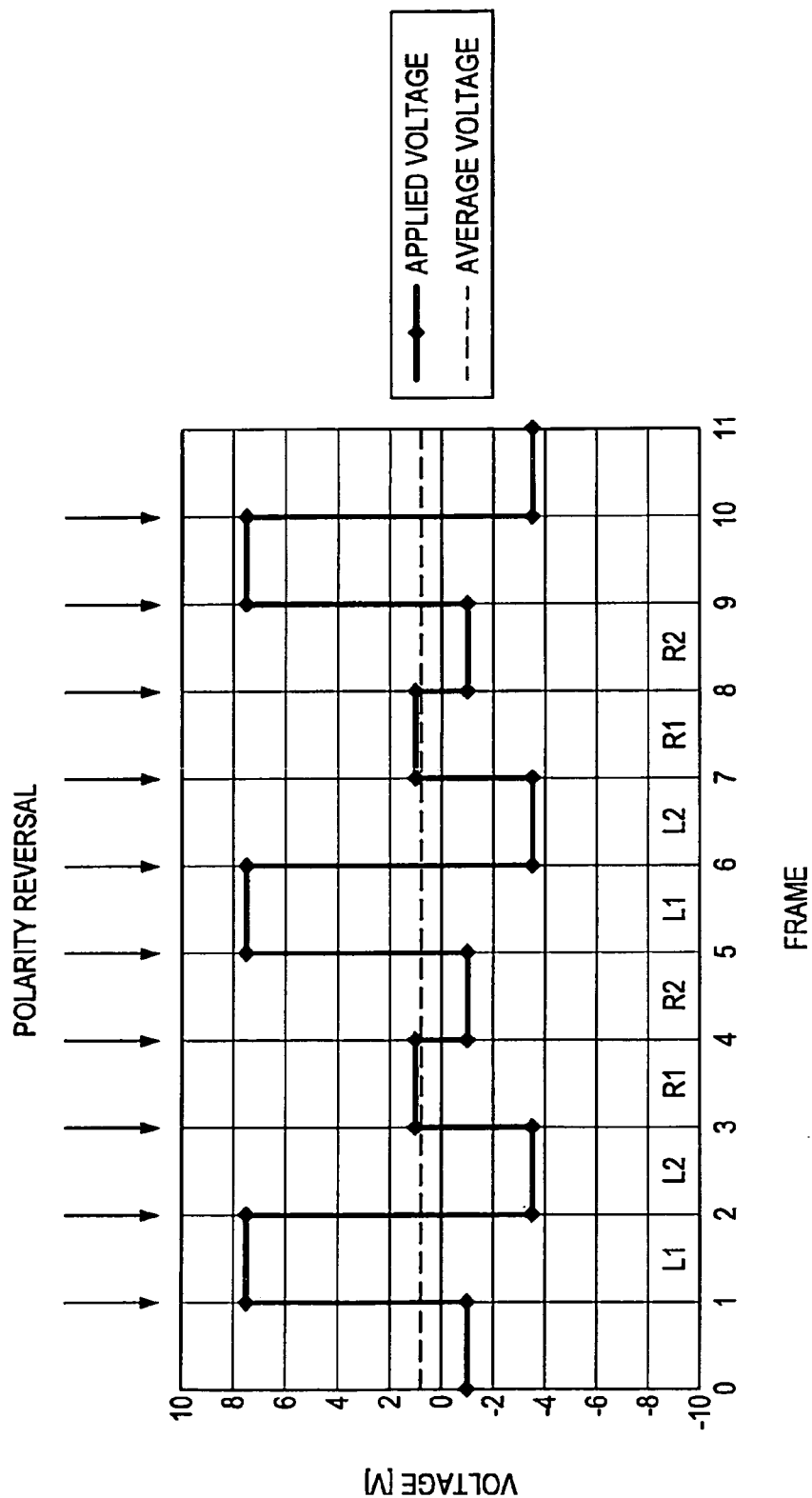
FIG. 4 is a characteristic diagram showing a drive voltage when polarity reversal is performed for each frame in a case of "write twice"

Hereinafter, a detailed description will be made with reference to the appended drawings. In the first embodiment in which the above-described "write twice" operation is performed, polarity bias is suppressed by optimizing a polarity reversal timing. First, the polarity of the drive voltage of the liquid crystal display panel 134 will be described with reference to FIG. 4. Each pixel of the liquid crystal display panel 134 emits light when a voltage corresponding to luminance is applied. FIG. 4 is a characteristic diagram showing a drive voltage when the polarity of the voltage applied to the liquid crystal is reversed for each frame, when the "write twice" operation illustrated in FIG. 3 is performed. When a normal liquid crystal display panel is driven, the polarity is reversed for each frame as shown in FIG. 4 to drive the liquid crystal display panel.

In FIG. 4, reference numerals L1, L2, R1 and R2 respectively indicate an image L1 for the left eye by the first write operation, an image L2 for the left eye by the second write operation, an image R1 for the right eye by the first write operation, and an image R2 for the right eye by the second write operation. Further, in FIG. 4, downward arrows ↓ each indicate a timing at which the polarity is reversed (which also applies to FIG. 5 to FIG. 9).

FIG. 4 shows, as an example, a case in which image display is performed such that the maximum value of the luminance of the left and right images is defined as a 255 gray level, the luminance of the image L for the left eye is defined as a 176 gray level, and the luminance of the image R for the right eye is defined as a 0 gray level. In other words, FIG. 4 shows a case in which the luminance of the image L for the left eye is relatively bright, and the luminance of the image R for the right eye is relatively dark. When the parallax between the image L for the left eye and the image R for the right eye is large, and an apparent position of a stereoscopic image protrudes to the front of the display screen of the liquid crystal display panel 134, or is positioned to the back of the display screen, the difference in luminance between the left and right images becomes large, and the voltage applied to the liquid crystal has the drive waveform shown in FIG. 4.

In order to correct the response speed of the liquid crystal in the case of FIG. 4, particularly, it is necessary to perform overdrive driving when the writing of the image L1 for the left eye is performed for the first time, because the luminance rapidly increases at this time. Therefore, in FIG. 4, the luminance of the image L1 for the left eye by the first write operation is corrected to a 245 gray level, the luminance of the image L2 for the left eye by the second write operation is corrected to a 185 gray level, and a voltage corresponding to each gray level is applied. Further, the luminance of the image R1 for the right eye by the first write operation is set to the 0 gray level, the luminance of the image R2 for the right eye by the second write operation is set to the 0 gray level, and a voltage corresponding to each gray level is applied. As a result of overdrive correction, in order for the luminance of the image L2 for the left eye of a second frame to have a desired value, an applied voltage corresponding to the image L1 for the left eye of a first frame has a sufficiently large value (approximately 8V) compared to that of the second frame.

When the polarity reversal is performed for each frame as shown in FIG. 4, if the left and right images are respectively displayed twice, an applied voltage by an overdrive correction amount is large when the image L1 for the left eye is displayed for the first time. Therefore, the value of the average voltage during a period of all frames shown in FIG. 4 is larger than zero (approximately 1V). As a result, a bias occurs in the polarity of the applied voltage, and a charge bias occurs. This in turn causes a burn-in phenomenon on the display screen of the liquid crystal display panel 134. When the images for the left eye or the images for the right eye are consecutively written a plurality of times as described above, the polarity bias is less likely to occur as compared to a "write once" operation that will be described later. However, the polarity bias occurs because an overdrive parameter (used when display is performed more than once) varies depending on which write operation it is (the first time or the second time etc.)

Figure 5:
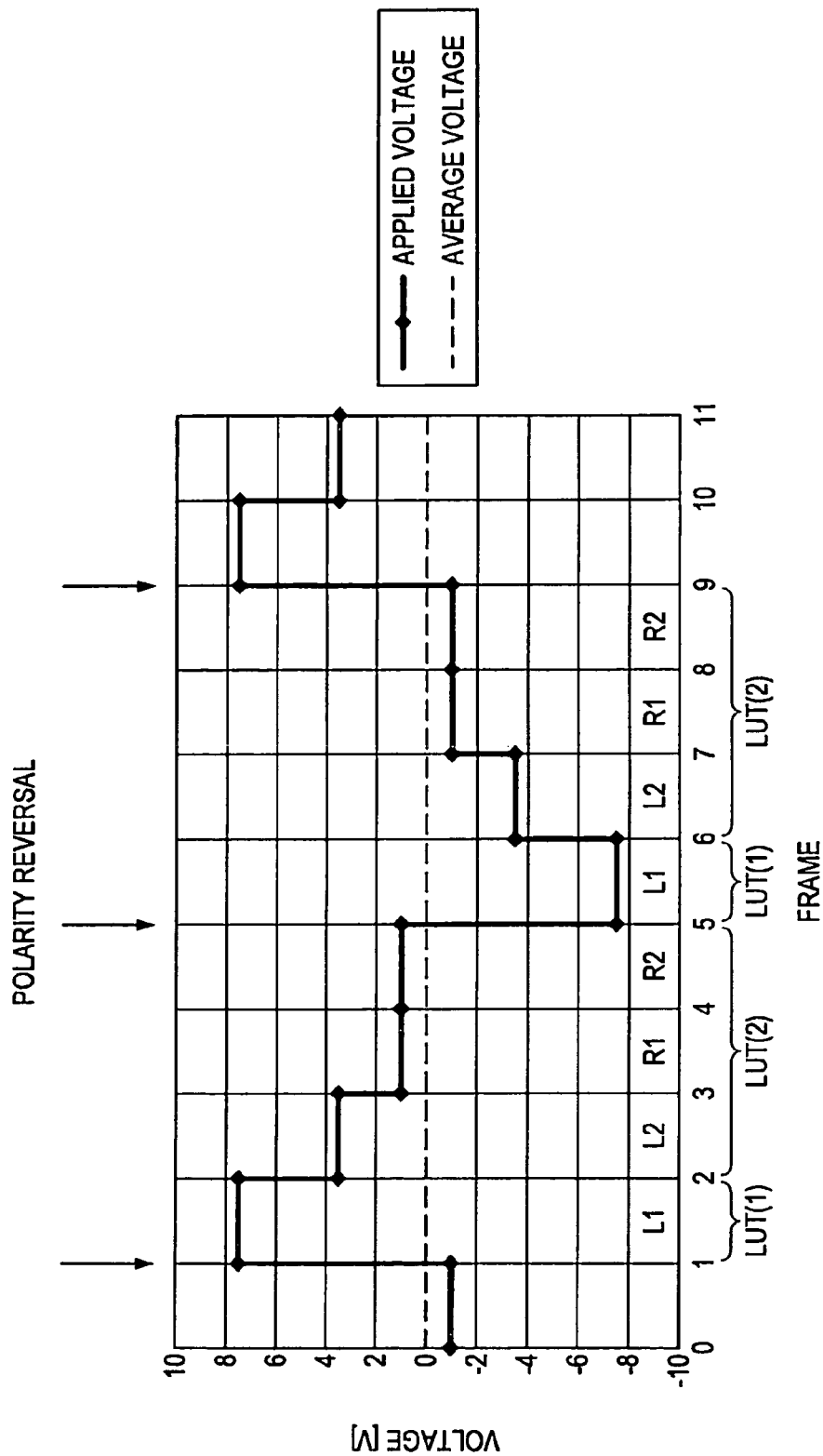
FIG. 5 is a characteristic diagram showing a drive voltage when the polarity reversal is performed after writing left and right images (L1, L2, R1, R2) respectively twice in the case of "write twice"

In order to address this, in the present embodiment, the polarity reversal of the voltage applied to the liquid crystal is performed once in every four frames, in a case of the "write twice" operation. FIG. 5 is a characteristic diagram showing an example of drive voltage according to the present embodiment. As shown in FIG. 5, in the present embodiment, the polarity reversal is performed once in every four frames, namely, the polarity is reversed after writing the left and right images (L1, L2, R1, R2) respectively twice. With this arrangement, the voltage when the image L1 for the left eye is written is alternately shifted to a plus side and a minus side. Therefore, if the applied voltage is averaged for every eight frames, the polarity bias can be made zero. Thus, from the point of view of a plurality of frames, the average voltage applied to liquid crystal can be made zero, and it is therefore possible to suppress the occurrence of the burn-in phenomenon on the liquid crystal display panel 134. Note that a polarity reversal circle may be a multiple number of the cycle shown in FIG. 5. For example, even when the polarity reversal is performed once in every eight frames, the polarity bias can be made zero.

Figure 6:
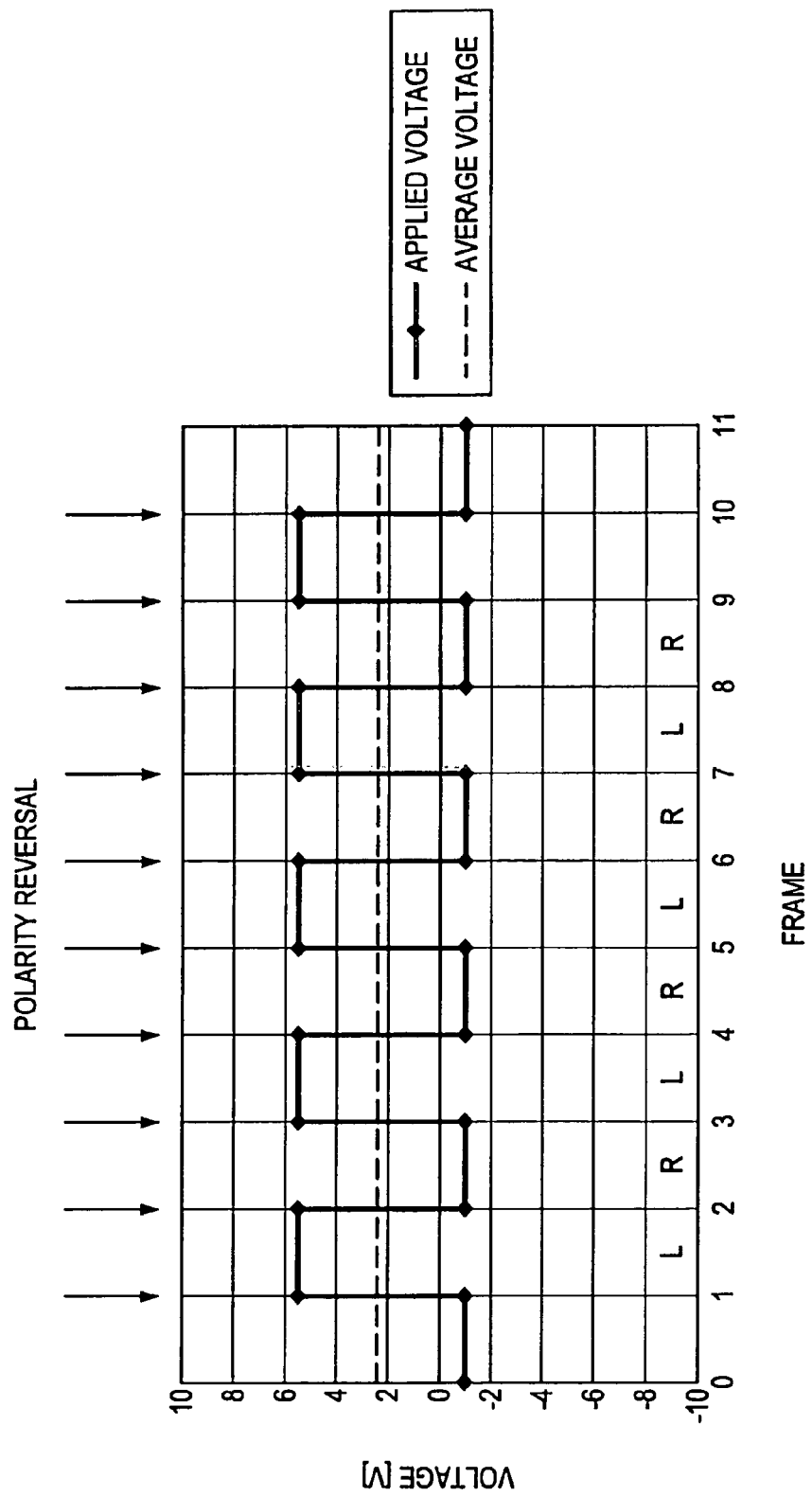
FIG. 6 is a characteristic diagram showing a drive voltage when the polarity reversal is performed for each frame in a case of "write once"

2. Second Embodiment (1) Example of Drive Voltage in Case of "Write Once" Operation Next, an example of drive voltage when the left and right images are alternately written one by one will be described with reference to FIG. 6 and FIG. 7. FIG. 6 is a characteristic diagram showing an example in which, in a case of the "write once" operation, the polarity of the drive voltage is reversed for each frame in a similar manner to FIG. 4. FIG. 6 shows an example in which image display is performed such that the maximum value of the luminance of the left and right images is defined as a 255 gray level, the luminance of the image L for the left eye is defined as a 208 gray level, and the luminance of the image R for the right eye is defined as a 0 gray level. Also in this case, in order to correct the response speed of the liquid crystal, actually, it is necessary to perform overdrive driving. Particularly when the image L for the left eye is written, the luminance rapidly increases and it is therefore necessary to perform overdrive driving. FIG. 6 shows an applied voltage after the overdrive correction. As shown in FIG. 6, after the overdrive correction, the luminance of the image L for the left eye is corrected to a 240 gray level, the luminance of the image R for the right eye is set to the 0 gray level, and a voltage corresponding to each gray level is applied. As shown in FIG. 6, when the polarity is reversed for each frame, a voltage having positive polarity that is relatively high is constantly applied to the image L for the left eye, while a voltage having negative polarity that is relatively low is constantly applied to the image R for the right eye. Therefore, the average voltage is a value larger than zero, and is around 2V. As a result, a bias occurs in the polarity, which may cause burn-in on the liquid crystal display panel 134.

Figure 7:
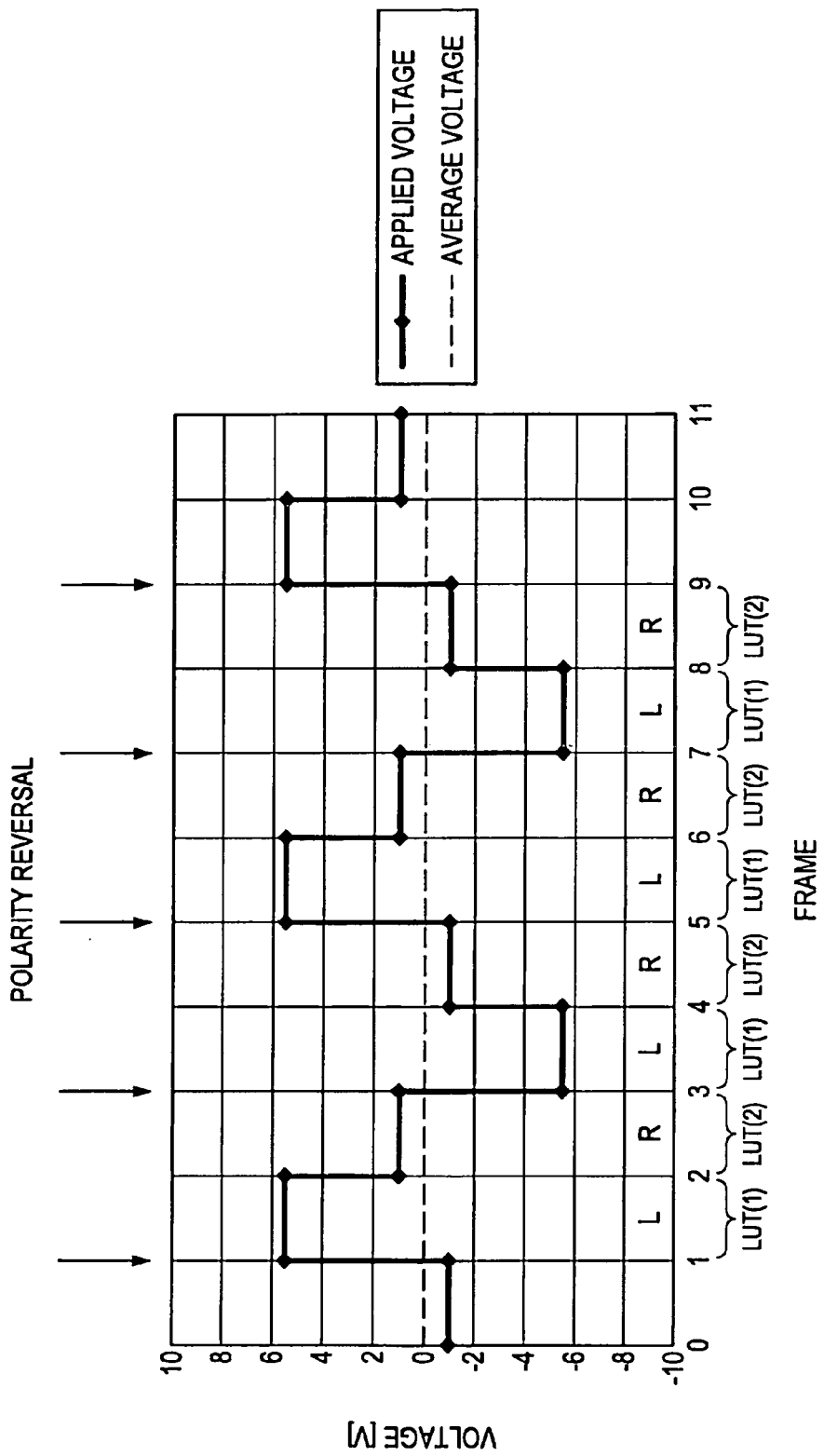
FIG. 7 is a characteristic diagram showing a drive voltage when the polarity reversal is performed every second frame in the case of "write once"

In order to address this, in the present embodiment, the polarity reversal is performed once in every two frames, in the case of the "write once" operation. FIG. 7 is a characteristic diagram showing an example of drive voltage according to the present embodiment. As shown in FIG. 7, the polarity reversal is performed once in every two frames, namely, the polarity is reversed after writing the left and right images (L, R). Therefore, if the applied voltage is averaged for every four frames, the polarity bias can be made zero. Thus, from the point of view of a plurality of frames, the average voltage can be made zero, and it is therefore possible to suppress the occurrence of the burn-in phenomenon on the liquid crystal display panel 134.

3. Third Embodiment (1) Example of Drive Voltage in Case of Gray Insertion

Next, drive voltage examples in the case of the "write twice" operation will be described with reference to FIG. 8 and FIG. 9, in which the second frame of the image for the left eye or the image for the right eye is a black image or a gray image. Note that, in the present specification, insertion of a black image or a gray image is sometimes collectively referred to as gray insertion. The gray insertion is performed such that the gray image or the black image is inserted into the second frame (L2, R2) of the image L for the left eye or the image R for the right eye. Thus, the image L for the left eye and the image R for the right eye are not mixed, and are separately recognized by the eyes of the user who visually recognizes the left and right images through the viewing glasses.

Figure 8:
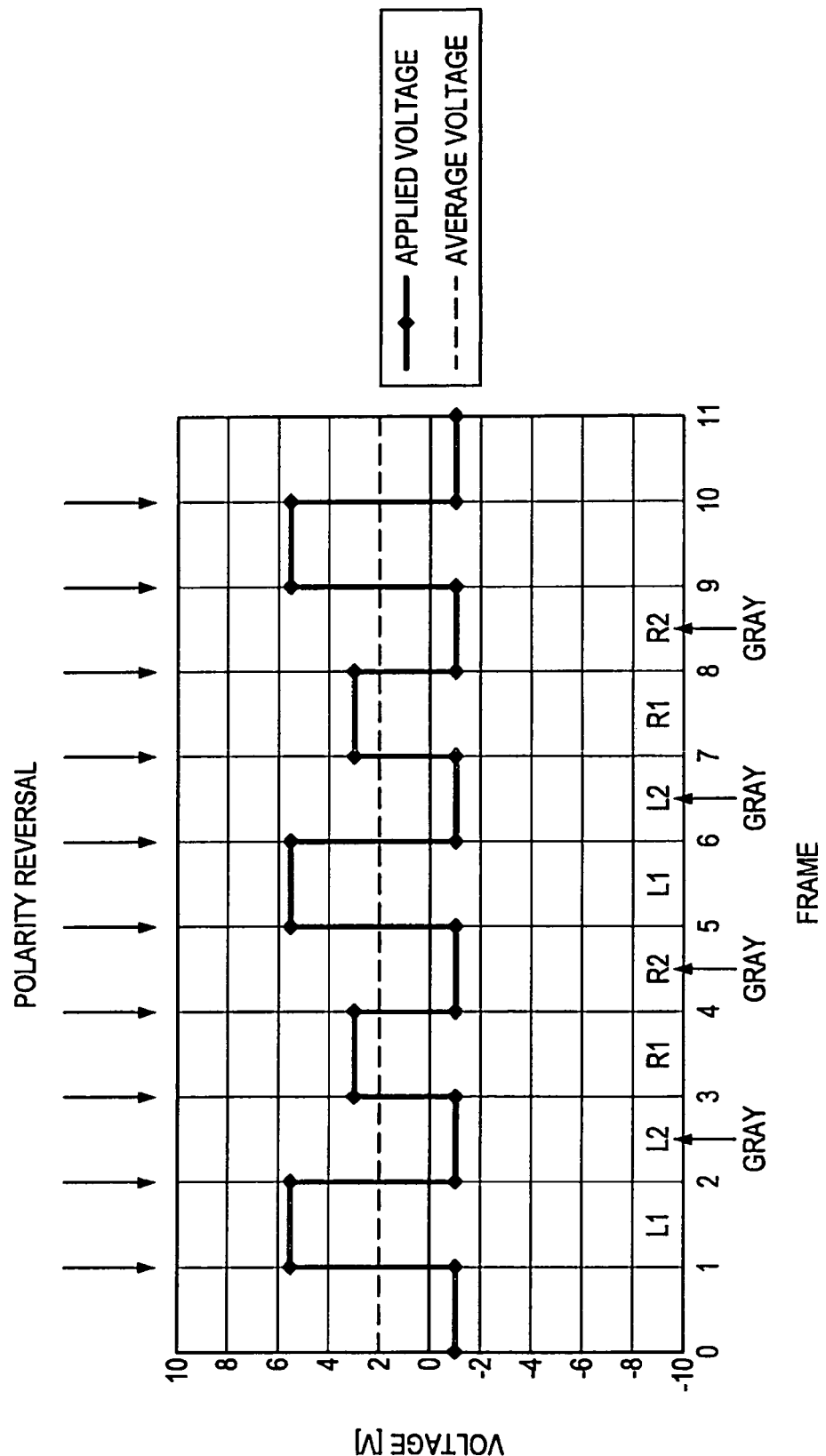
FIG. 8 is a characteristic diagram showing a drive voltage when the polarity reversal is performed for each frame in a case of gray insertion.

FIG. 8 is a characteristic diagram showing an example in which, in the case of gray insertion, the polarity of the drive voltage is reversed for each frame in a similar manner to FIG. 4. FIG. 8 shows an example in which image display is performed such that the maximum value of the luminance of the left and right images is defined as a 255 gray level, the luminance of the image L1 for the left eye is defined as a 224 gray level, the luminance of the image R1 for the right eye is defined as a 128 gray level, and the luminance of the gray image that is inserted to the second frame (L2, R2) of the left and right images is defined as a 32 gray level. Also in this case, in order to correct the response speed of the liquid crystal, actually, it is necessary to perform overdrive driving. Particularly when the image L1 for the left eye and the image R1 for the right eye are written, the luminance rapidly increases and it is therefore necessary to perform overdrive driving. As shown in FIG. 8, after the overdrive correction, the luminance of the image L1 for the left eye is corrected to a 250 gray level, the luminance of L2 at the time of gray insertion (after the image L1 for the left eye) is corrected to a 0 gray level, the luminance of the image R1 for the right eye is corrected to a 140 gray level, the luminance of R2 at the time of gray insertion (after the image R1 for the right eye) is corrected to the 0 gray level, and a voltage corresponding to each gray level is applied. In this case, a voltage having positive polarity that is relatively high is constantly applied to the image L1 for the left eye and the image R1 for the right eye, while a voltage having negative polarity that is relatively low is constantly applied at the time of gray insertion. As a result, a bias occurs in the polarity.

As described above, when a system is adopted in which a black image or a gray image is inserted between the left and right images in order to improve crosstalk, the polarity bias is remarkable. As a result, when a video signal is displayed, the same polarity constantly appears.

In order to address this, in the present embodiment, the polarity reversal is performed once in every four frames in the case of gray insertion. FIG. 9 is a characteristic diagram showing an example of drive voltage according to the present embodiment. As shown in FIG. 9, the polarity reversal is performed once in every four frames, namely, the polarity is reversed after the insertion of the gray images (L2, R2) after writing the left and right images (L1, R1). Therefore, the polarity bias can be made zero. Thus, from the point of view of a plurality of frames, the average voltage can be made zero, and it is therefore possible to suppress the occurrence of the burn-in phenomenon on the liquid crystal display panel 134.

4. Fourth Embodiment (1) Overdrive Parameter

With the above-described drive in which the polarity reversal is not performed each time, if a writing performance of a thin film transistor (TFT) of the liquid crystal display panel 134 is insufficient, it is assumed that an effective voltage varies depending on whether or not the polarity reversal is performed, even when a voltage corresponding to the same gray level is input. Also when a charge sharing driving method is used, it is assumed that an effective voltage varies depending on whether or not the polarity reversal is performed. More specifically, for example, when the polarity reversal is not performed, a capacity for charge sharing and a pixel capacity have the same polarity, and charge sharing does not occur. As a result, a pixel voltage when the polarity reversal is performed is lower than that when the polarity reversal is not performed. In this manner, it is assumed that the effective voltage when the polarity reversal is performed is lower than that when the polarity reversal is not performed, even when a voltage corresponding to the same gray level is input.

For this reason, in the present embodiment, an overdrive parameter (a lookup table) used when the polarity reversal is performed and an overdrive parameter used when the polarity reversal is not performed are separately prepared. Then, a different overdrive correction is applied depending on whether or not the polarity reversal is performed. Thus, the effective voltage can be the same regardless of whether or not the polarity reversal is performed.

FIG. 10 and FIG. 11 are schematic diagrams that show two different overdrive parameters (lookup tables). Here, FIG. 10 shows a lookup table (LUT1) that is used when polarity reversal is performed, and FIG. 11 shows a lookup table (LUT2) that is used when the polarity reversal is not performed.

Here, FIG. 5 is used as an example. As shown in FIG. 5, when the image L1 for the left eye is written, the polarity reversal is performed, and the lookup table LUT1 shown in FIG. 10 is therefore used to perform the overdrive processing. On the other hand, when the images L2, R1 and R2 are written, the polarity reversal is not performed, and the lookup table LUT2 shown in FIG. 11 is therefore used to perform the overdrive processing. As shown in FIG. 10 and FIG. 11, stronger overdrive processing is performed based on the lookup table LUT1 that is used when the polarity reversal is performed, as compared to the overdrive processing based on the lookup table LUT2 that is used when the polarity reversal is not performed. Thus, the effective voltage can be the same regardless of whether or not the polarity reversal is performed.

Figure 9:
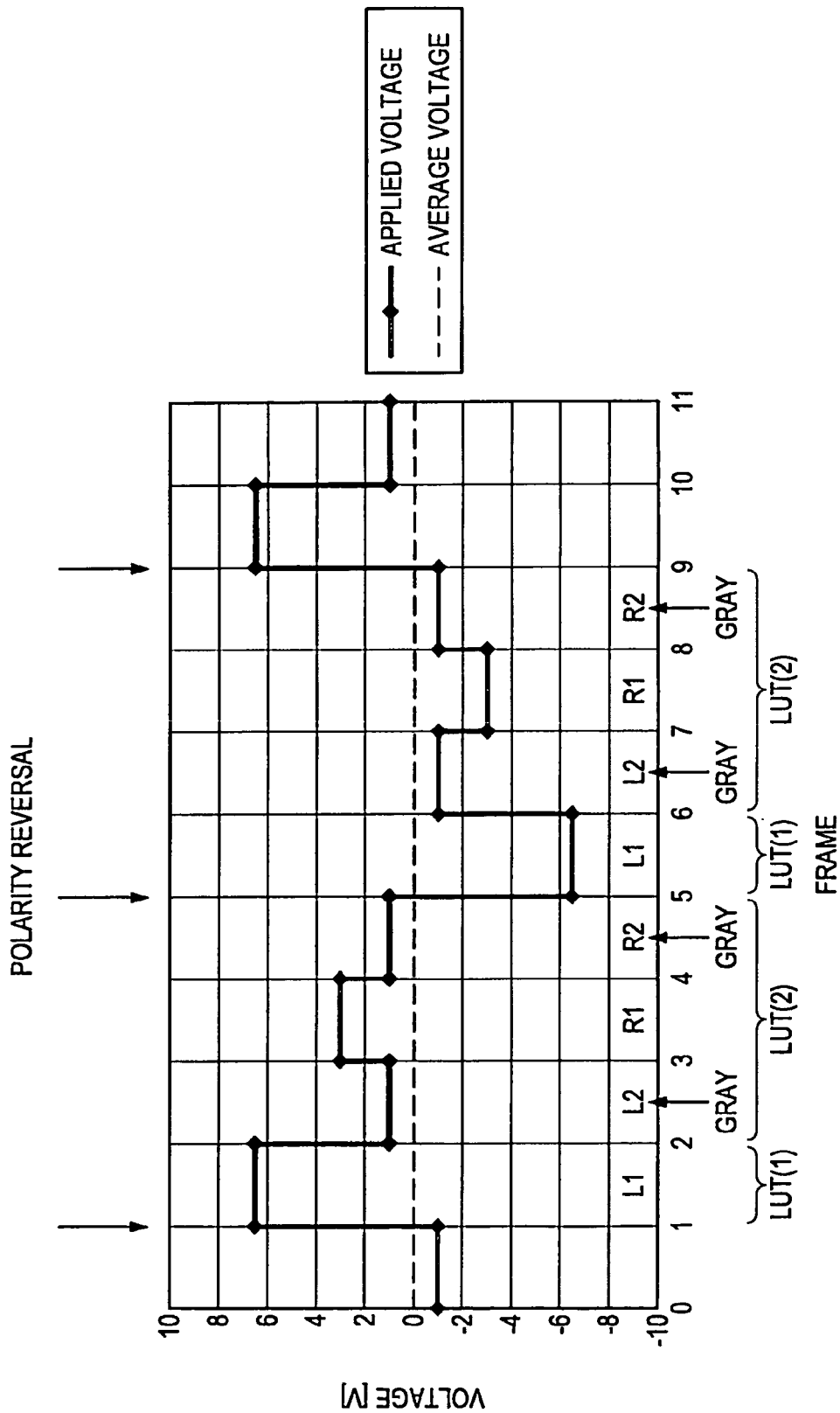
FIG. 9 is a characteristic diagram showing a drive voltage when the polarity reversal is performed after the gray insertion in the case of the gray insertion.

In a similar manner, as shown in FIG. 7 and FIG. 9, at the time of writing when the polarity reversal is performed, the lookup table LUT1 shown in FIG. 10 is used to perform the overdrive processing. At the time of writing when the polarity reversal is not performed, the lookup table LUT2 shown in FIG. 11 is used to perform the overdrive processing.

As described above, according to the present embodiment, a different overdrive correction is applied depending on whether or not the polarity reversal is performed. Thus, the effective voltage can be the same regardless of whether or not the polarity reversal is performed. Therefore, it is possible to display images with appropriate luminance according to a target value.

The exemplary embodiments of the present invention are described in detail above with reference to the appended drawings. However, the present invention is not limited to the above-described examples. It should be understood by those skilled in the art that various modifications, combinations, sub-combinations and alterations may occur depending on design requirements and other factors insofar as they are within the scope of the appended claims or the equivalents thereof.

What is claimed is:

1. An image display device comprising:
    a signal control portion that receives input of an image signal, and outputs a signal that causes an image for a right eye and an image for a left eye to be displayed alternately;
    a display panel to which the signal converted by the signal control portion is input, and which alternately displays the image for the right eye and the image for the left eye; and
    a polarity reversing portion that performs polarity reversal of a drive voltage of the display panel due to the signal,
    wherein each said image for the right eye and each said image for the left eye corresponds to a respective frame,
    wherein the signal outputted from the signal control portion causes each frame of the image for the left (L) eye and each frame of the image for the right (R) eye to be written twice in a consecutive manner so as to provide an image sequence of L (a first time), L (a second time), R (a first time), and R (a second time),
    wherein in the image sequence of the first time L, the second time L, the first time R, and the second time R, only the images of the second time L and the second time R, are caused to be displayed for view by a user,
    wherein a predetermined blank period is inserted between (i) the L of the first time and the L of the second time, and (ii) the R of the first time and the R of the second time, and
    wherein the polarity reversing portion performs polarity reversal of the drive voltage once in every four frames or once in every 4N frames, in which N is a positive integer.

2. The image display device according to claim 1, further comprising:
    an insertion portion that inserts one of a gray image and a black image to some of the images for the right eye and the images for the left eye.

3. The image display device according to claim 1, further comprising:
    an overdrive processing portion that performs overdrive processing on the signal,
    wherein the overdrive processing portion performs the overdrive processing using a different parameter depending on whether the polarity reversal is performed.

4. An image display viewing system comprising:
    an image display device including a signal control portion that receives input of an image signal, and outputs a signal that causes an image for a right eye and an image for a left eye to be displayed alternately,
    a display panel to which the signal converted by the signal control portion is input, and which alternately displays the image for the right eye and the image for the left eye,
    a polarity reversing portion that performs polarity reversal of a drive voltage of the display panel due to the signal, at least every time both the image for the right eye and the image for the left eye are displayed,
    a shutter control portion that performs control such that a timing signal is generated for stereoscopic image viewing glasses provided with a right eye shutter and a left eye shutter, the timing signal indicating an open period of the right eye shutter and the left eye shutter; and
    the stereoscopic image viewing glasses that have the right eye shutter and the left eye shutter, and that alternately open the right eye shutter and the left eye shutter based on the timing signal,
    wherein each said image for the right eye and each said image for the left eye corresponds to a respective frame,
    wherein the signal outputted from the signal control portion causes each frame of the image for the left (L) right eye and each frame of the image for the right (R) eye to be written twice in a consecutive manner so as to provide an image sequence of L (a first time), L (a second time), R (a first time), and R (a second time),
    wherein in the image sequence of the first time L, the second time L, the first time R, and the second time R, only the images of the second time L and the second time R, are caused to be displayed for view by a user, wherein a predetermined blank period is inserted between (i) the L of the first time and the L of the second time, and (ii) the R of the first time and the R of the second time, and wherein the polarity reversing portion performs polarity reversal of the drive voltage once in every four frames or once in every 4N frames, in which N is a positive integer.

5. An image display method, comprising the steps of:

receiving input of an image signal, and outputting a signal that causes an image for a right eye and an image for a left eye to be displayed alternately;

inputting the converted signal, and alternately displaying the image for the right eye and the image for the left eye; and performing polarity reversal of a drive voltage of a display panel due to the signal, wherein each said image for the right eye and each said image for the left eye corresponds to a respective frame, wherein the signal outputted in the outputting step causes each frame of the image for the left (L) right eye and each frame of the image for the right (R) eye to be written twice in a consecutive manner so as to provide an image sequence of L (a first time), L (a second time), R (a first time), and R (a second time), wherein in the image sequence of the first time L, the second time L, the first time R, and the second time R, only the images of the second time L and the second time R, are caused to be displayed for view by a user, wherein a predetermined blank period is inserted between (i) the L of the first time and the L of the second time, and (ii) the R of the first time and the R of the second time, and wherein the performing step performs polarity reversal of the drive voltage once in every four frames or once in every 4N frames, in which N is a positive integer.

6. The image display device according to claim 1, in which in the image sequence of L, L, R, and R, the drive voltage for a first frame of the left eye is larger than that of a second frame of the left eye.

7. The image display device according to claim 1, further comprising an overdrive processing portion to perform overdrive processing on the signal, and in which a voltage value of the overdrive processing portion averaged over eight (8) frames is zero such that a polarity bias is zero.

8. The image display device according to claim 1, in which a driving frequency pertaining to frame display is 240 Hz.

\* \* \* \* \*